(12) United States Patent
Pearson et al.

(10) Patent No.: US 7,706,535 B1
(45) Date of Patent: Apr. 27, 2010

(54) SYSTEMS AND METHODS FOR IMPLEMENTING ROUTING PROTOCOLS AND ALGORITHMS FOR QUANTUM CRYPTOGRAPHIC KEY TRANSPORT

(75) Inventors: David Spencer Pearson, Bennington, VT (US); Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1416 days.

(21) Appl. No.: 10/799,177

(22) Filed: Mar. 12, 2004

Related U.S. Application Data

(60) Provisional application No. 60/456,815, filed on Mar. 21, 2003.

(51) Int. Cl.
*H04K 1/00* (2006.01)
(52) U.S. Cl. .................................. 380/255; 380/256
(58) Field of Classification Search ......... 380/255–257, 380/259, 277–278; 713/171
See application file for complete search history.

(56) References Cited

U.S. PATENT DOCUMENTS

| | | |
|---|---|---|
| 4,445,116 A | 4/1984 | Grow |
| 4,649,233 A | 3/1987 | Bass et al. |
| 4,770,535 A | 9/1988 | Kim et al. |
| 5,058,973 A | 10/1991 | Refregier et al. |
| 5,157,461 A | 10/1992 | Page |
| 5,243,649 A | 9/1993 | Franson |
| 5,307,410 A | 4/1994 | Bennett |
| 5,311,572 A | 5/1994 | Friedes et al. |
| 5,325,397 A | 6/1994 | Scholz et al. |
| 5,339,182 A | 8/1994 | Kimble et al. |
| 5,400,325 A | 3/1995 | Chatwani et al. |
| 5,414,771 A | 5/1995 | Fawcett, Jr. |
| 5,469,432 A | 11/1995 | Gat |
| 5,502,766 A | 3/1996 | Boebert et al. |
| 5,515,438 A | 5/1996 | Bennett et al. |
| 5,535,195 A | 7/1996 | Lee |
| 5,602,916 A | 2/1997 | Grube et al. |
| 5,675,648 A | 10/1997 | Townsend |
| 5,710,773 A | 1/1998 | Shiga |
| 5,729,608 A | 3/1998 | Janson et al. |

(Continued)

FOREIGN PATENT DOCUMENTS

WO   WO 96/07951   3/1996

(Continued)

OTHER PUBLICATIONS

Office action issued on Oct. 23, 2007 for U.S. Appl. No. 10/324,355.

(Continued)

*Primary Examiner*—Hosuk Song
(74) *Attorney, Agent, or Firm*—Ropes & Gray LLP

(57) ABSTRACT

A quantum cryptographic key distribution (QKD) relay (205) includes one or more interfaces (530-1 through 530-N) and processing logic (505). The one or more interfaces (530-1 through 530-N) receive secret keys from other QKD relays in a QKD network. The processing logic (505) determines one or more paths for transporting the secret keys, using quantum cryptographic techniques, across a QKD network and route the secret keys towards a respective destination across the QKD network using the determined one or more paths.

11 Claims, 11 Drawing Sheets

U.S. PATENT DOCUMENTS

| | | | |
|---|---|---|---|
| 5,732,139 A | 3/1998 | Lo et al. | |
| 5,757,912 A | 5/1998 | Blow | |
| 5,764,765 A * | 6/1998 | Phoenix et al. | 380/283 |
| 5,764,767 A | 6/1998 | Beimel et al. | |
| 5,768,378 A | 6/1998 | Townsend et al. | |
| 5,768,391 A | 6/1998 | Ichikawa | |
| 5,805,801 A | 9/1998 | Holloway et al. | |
| 5,850,441 A | 12/1998 | Townsend et al. | |
| 5,911,018 A | 6/1999 | Bischel et al. | |
| 5,953,421 A | 9/1999 | Townsend | |
| 5,960,131 A | 9/1999 | Fouquet et al. | |
| 5,960,133 A | 9/1999 | Tomlinson | |
| 5,966,224 A | 10/1999 | Hughes et al. | |
| 6,005,993 A | 12/1999 | MacDonald | |
| 6,028,935 A | 2/2000 | Rarity et al. | |
| 6,052,465 A | 4/2000 | Gotoh et al. | |
| 6,097,696 A | 8/2000 | Doverspike | |
| 6,122,252 A | 9/2000 | Aimoto et al. | |
| 6,130,780 A | 10/2000 | Joannopoulos et al. | |
| 6,145,024 A | 11/2000 | Maezawa et al. | |
| 6,151,586 A | 11/2000 | Brown | |
| 6,154,586 A | 11/2000 | MacDonald et al. | |
| 6,160,627 A | 12/2000 | Ahn et al. | |
| 6,160,651 A | 12/2000 | Chang et al. | |
| 6,188,768 B1 | 2/2001 | Bethune et al. | |
| 6,208,935 B1 | 3/2001 | Yamada et al. | |
| 6,233,075 B1 | 5/2001 | Chang et al. | |
| 6,233,393 B1 | 5/2001 | Yanagihara et al. | |
| 6,272,548 B1 * | 8/2001 | Cotter et al. | 709/239 |
| 6,289,104 B1 | 9/2001 | Patterson et al. | |
| 6,341,127 B1 | 1/2002 | Katsube et al. | |
| 6,378,072 B1 | 4/2002 | Collins et al. | |
| 6,430,345 B1 | 8/2002 | Dultz et al. | |
| 6,438,234 B1 | 8/2002 | Gisin et al. | |
| 6,463,060 B1 | 10/2002 | Sato et al. | |
| 6,507,012 B1 | 1/2003 | Medard et al. | |
| 6,519,062 B1 | 2/2003 | Yoo | |
| 6,522,749 B2 | 2/2003 | Wang | |
| 6,529,498 B1 | 3/2003 | Cheng | |
| 6,532,543 B1 | 3/2003 | Smith et al. | |
| 6,539,410 B1 | 3/2003 | Klass | |
| 6,556,544 B1 | 4/2003 | Lee | |
| 6,560,707 B2 | 5/2003 | Curtis et al. | |
| 6,563,796 B1 | 5/2003 | Saito | |
| 6,594,055 B2 | 7/2003 | Snawerdt | |
| 6,605,822 B1 | 8/2003 | Blais et al. | |
| 6,646,727 B2 | 11/2003 | Saleh et al. | |
| 6,647,010 B1 | 11/2003 | Ford et al. | |
| 6,650,805 B2 | 11/2003 | Chen et al. | |
| 6,654,346 B1 | 11/2003 | Mahalingaiah et al. | |
| 6,661,806 B1 | 12/2003 | Eriksson et al. | |
| 6,678,379 B1 | 1/2004 | Mayers et al. | |
| 6,684,335 B1 | 1/2004 | Epstein et al. | |
| 6,720,589 B1 | 4/2004 | Shields | |
| 6,721,269 B2 | 4/2004 | Cao et al. | |
| 6,728,281 B1 | 4/2004 | Santori et al. | |
| 6,748,434 B2 | 6/2004 | Kavanagh | |
| 6,754,214 B1 | 6/2004 | Mahalingaiah | |
| 6,778,557 B1 | 8/2004 | Yuki et al. | |
| 6,799,270 B1 | 9/2004 | Bull et al. | |
| 6,801,626 B1 | 10/2004 | Nambu | |
| 6,836,463 B2 | 12/2004 | Garcia-Luna-Aceves et al. | |
| 6,862,564 B1 | 3/2005 | Shue et al. | |
| 6,873,797 B2 | 3/2005 | Chang et al. | |
| 6,882,431 B2 | 4/2005 | Teich et al. | |
| 6,895,091 B1 | 5/2005 | Elliott et al. | |
| 6,895,092 B2 | 5/2005 | Tomita | |
| 6,897,434 B1 | 5/2005 | Kumar et al. | |
| 6,934,472 B2 | 8/2005 | Chang et al. | |
| 6,986,056 B1 | 1/2006 | Dultz et al. | |
| 7,028,059 B2 | 4/2006 | Williams et al. | |
| 7,035,411 B2 | 4/2006 | Azuma et al. | |
| 7,068,790 B1 | 6/2006 | Elliott | |
| 2001/0038695 A1 | 11/2001 | Kim | |
| 2002/0015573 A1 | 2/2002 | Ishibashi | |
| 2002/0021467 A1 | 2/2002 | Ofek et al. | |
| 2002/0025041 A1 | 2/2002 | Tomita | |
| 2002/0097874 A1 | 7/2002 | Foden et al. | |
| 2002/0110245 A1 | 8/2002 | Gruia | |
| 2002/0141019 A1 | 10/2002 | Chang et al. | |
| 2003/0002670 A1 | 1/2003 | Wang | |
| 2003/0002674 A1 | 1/2003 | Nambu et al. | |
| 2003/0059157 A1 | 3/2003 | DeCusatis et al. | |
| 2003/0137944 A1 | 7/2003 | Medvinsky | |
| 2003/0180042 A1 | 9/2003 | Nelles et al. | |
| 2003/0215088 A1 | 11/2003 | Bao | |
| 2003/0231771 A1 | 12/2003 | Gisin et al. | |
| 2004/0005056 A1 | 1/2004 | Nishioka et al. | |
| 2004/0008843 A1 | 1/2004 | Van Enk | |
| 2004/0019676 A1 | 1/2004 | Iwatsuki et al. | |
| 2004/0032954 A1 | 2/2004 | Bonfrate et al. | |
| 2004/0109564 A1 | 6/2004 | Cerf et al. | |
| 2004/0136321 A1 | 7/2004 | Ren et al. | |
| 2004/0165884 A1 | 8/2004 | Al-Chalabi | |
| 2004/0190725 A1 | 9/2004 | Yuan et al. | |
| 2005/0036624 A1 | 2/2005 | Kent et al. | |
| 2006/0059343 A1 | 3/2006 | Berzanskis | |
| 2006/0252381 A1 | 11/2006 | Sasaoka et al. | |

FOREIGN PATENT DOCUMENTS

WO      WO 02/05480      1/2002

OTHER PUBLICATIONS

U.S. Appl. No. 09/611,783, filed Jul. 7, 2000; entitled: "Systems and Methods for Implementing a Quantum-Cryptographic Communications Network," 42 pages.

Co-pending application filed on entitled "Systems and Methods for Quantum Cryptographic Key Transport" 68 pages.

Office action issued on Sep. 6, 2007 for U.S. Appl. No. 10/803,509.

Office action issued on Jul. 10, 2007 for U.S. Appl. No. 10/795,313.

Office action issued on May 25, 2007 for U.S. Appl. No. 10/218,652.

"Quantum key distribution: Real-time compensation of interferometer phase drift," NTNU Department of Physical Electronics, pp. 1-45.

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Experimental Quantum Cryptography," Journal of Cryptography's special issue after Eurocrypt '90, 28 pages (Sep. 1991).

Bennett, C.H., et al., "Generalized Privacy Amplification," IBM Research, 24 pages (May 31, 1995).

Bennett, C.H., et al., "Quantum Cryptography: Public Key Distribution and Coin Tossing," Proceedings of IEEE International Conference on Computers, Systems & Signal Processing, Bangalore, India, pp. 175-179, Dec. 10-12, 1984.

Bethune, D.S., et al., "An Autocompensating Fiber-Optic Quantum Cryptography System Based on Polarization Splitting of Light," IEEE Journal of Quantum Electronics, XX(Y):100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Crepeau, C., et al., "Secure Multi-party Quantum Computation," ACM, pp. 1-10 (2001).

Eisenberg, S., "Lucent Technologies names Cherry Murray physical sciences research vice president," Press Release (Mar. 28, 2000).
Ekert, A.K., "Quantum Cryptography Based on Bell's Theorem," Physical Review Letters, 67(6):661-663 (1991).
Elliott, B.B., et al., "Path-length control in a interferometric QKD link," Proc. of SPIE, vol. #5101, 11 pages (Apr. 21, 2003).
Franson, J.D., "Bell Inequality for Position and Time," Physical Review Letters, 62(19):2205-2208 (1989).
Gisin, N., et al., "Quantum cryptography and long distance Bell experiments: How to control decoherence," Geneva, Switzerland, pp. 1-7 and 4 pages of drawings (Jan. 15, 1999).
Gisin, N., et al., "Quantum cryptography," Reviews of Modern Physics, 74:145-184 (2002).
Gottesman, D., et al., "Secure quantum key distribution using squeezed states," pp. 1-19 (Sep. 25, 2000).
Jennewein, T., et al., "Quantum Cryptography with Entangled Photons," Physical Review Letters, 84(20):4729-4732 (2000).
Lin, L.Y., et al., "Free-Space Micromachined Optical Switches for Optical Networking," IEEE Journal of Selected Topics in Quantum Electronics, 5(1):4-9 (1999).
Maurer, U., et al., "Information-Theoretic Key Agreement: From Weak to Strong Secrecy for Free," Computer Science Department, Swiss Federal Institute of Technology, 20 pages (2000).
Maurer, U.M., "Secret Key Agreement by Public Discussion From Common Information," IEEE Transactions on Information Theory, 39:733-742 (1993).
Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.
Naik, D.S., et al., "Entangled State Quantum Cryptography: Eavesdropping on the Ekert Protocol," Physical Review Letters, 84(20):4733-4736 (2000).
Ribordy, G., et al., "Long-distance entanglement-based quantum key distribution," Physical Review A, vol. 63, 012309-1-012309-12 (2001).
Rosen, E., et al., "Multiprotocol Label Switching Architecture," MPLS Architecture, 1-61 (Jan. 2001).
Scarani, V., et al., "Quantum Cryptography Protocols Robust Against Photon Number Splitting Attacks for Weak Lazer Pulse Implementations," Physical Review Letters, 92(5):057901-1 through 057901-4 (Feb. 2004).
Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.
Slutsky, B., et al., "Defense frontier analysis of quantum cryptographic systems," Applied Optics, 37(14):2869-2878 (1998).
Stucki, D., et al., "Quantum Key Distribution over 67 km with a plug&play system," New Journal of Physics, 41.1-41.8 (2002).
Tanzilli, S., et al., "PPLN waveguide for quantum communication," Eur. Phys. J.D., 18:155-160 (2002).
Tittel, W., et al., "Long-distance Bell-type tests using energy-time entangled photons," Physical Review A, 59(6):4150-4163 (1999).
Walker, J.A., "Telecommunications Applications of MEMS," mstnews, pp. 6-9 (Mar. 2000).
Xiao, L., et al., "Efficient Multi-Party Quantum Secret Sharing Schemes" pp. 1-7 (May 28, 2004).
Degermark, M., et al., "Small Forwarding Tables for Fast Routing Lookups," ACM, pp. 3-14 (1997).
Estrin, D., et al., "Security Issues in Policy Routing," IEEE, pp. 183-193 (1989).
Garcia-Luna-Aceves, J.J., et al., "Distributed, Scalable Routing Based on Vectors of Link States," IEEE Journal on Selected Areas in Communications, 13(8):1383-1395 (Oct. 1995).
Garcia-Luna-Aceves, J.J., et al., "Scalable Link-State Internet Routing," Network Protocols (Oct. 13-16, 1998).
Lakshman, T.V., et al., "High-Speed Policy-based Packet Forwarding Using Efficient Multi-dimensional Range Matching," Proceedings of the ACM SIGCOMM'98 conference on Applications, technologies, architectures and protocols for computer communication, pp. 203-214 (1998).
Lampson, B., et al., "IP Lookups Using Multiway and Multicolumn Search," IEEE/ACM Transactions on Networking, 7(3):324-334 (Jun. 1999).
Ramanathan, R., et al., "Hierarchically-organized, multihop mobile wireless networks for quality-of-service support," Mobile Networks and Applications, 3:101-119 (1998).
Tsai, W.T., "An Adaptive Hierarchical Routing Protocol," IEEE Transactions on Computers, 38(8):1059-1075 (Aug. 1989).
Waldvogel, M., et al., "Scalable High Speed IP Routing Lookups," ACM, pp. 25-36 (1997).
Bowers, J.E., "Optical Network and Component Trends," UCSB, NSF Workshop, 51 pages.
Honjo, T., et al., "Differential-phase-shift Quantum Key Distribution," NTT Technical Review, 2(12):26-33 (Dec. 2004).
Paniccia, M., "Silicon Integrated Protonics," ICSB, 30 pages, Feb. 2, 2005.
Tomita, A., et al., "Recent Progress in Quantum Key Transmission," NEC J. of Adv. Tech., 2(1):84-91 (Winter 2005).
Bennett, C.H., "Quantum Cryptography Using Any Two Nonorthogonal States," Physical Review Letters, 68(21):3121-3124 (1992).
Bennett, C.H., et al., "Experimental Quantum Cryptography," J. Cryptology, 5:3-28 (1992).
Butler, W.T., et al. "Free space quantum-key distribution," Physical Review A, 57(4):2379-2382 (Apr. 1998).
Jacobs, B.C., et al., "Quantum cryptography in free space," Optics Letters, 21(22):1854-1856 (Nov. 1996).
Bethune, D.S., et al., An Autocompensating Fiber-Optic Quantum Cryptography System Based on Polarization Splitting of Light, IEEE Journal of Quantum Eelctronics, 36(3):340-347 (2000).
Office action issued on Dec. 27, 2007 for U.S. Appl. No. 10/795,313.
Office action issued on Oct. 11, 2007 for U.S. Appl. No. 10/795,398.
Imamoglu, A., et al., "Turnstile Device for Heralded Single Photons: Coulomb Blockade of Electron and Hole Tunneling in Quantum Confined p-i-n Heterojunctions," Physical Review Letters, 72(2):210-213 (1994).
Bennett et al., "Quantum Cryptography: Publick Key Distribution and Coin Tossing," International Conference on computers & Signal Processing, pp. 1-6, Dec. 1984.
Brassard et al., "Cryptology Column—25 Years of Quantum Cryptography," Pragocrypt, pp. 13-24, Jul. 1996.
Elliott, Chip "Building the Quantum Network," New Journal of Physics, 46(4):1-12, (2002).
Schneier, Bruce "Applied Cryptography," Second Edition, Chapter 10, Oct. 18, 1995, Wiley & Sons Publ, pp. 216-220.
Laser End-Point-Detection System. IBM Technical Disclosure Bulletin. 28:7, 3151-53. (1985).
Quantum Public Key Distribution System. IBM Technical Disclosure Bulletin, 28:7, 3154-63. (1985).
Collins, Graham P. Quantum Cryptography Defies Eavesdropping. Physics Today. pp. 21-23 (1992).
Townsend et al. Single Photon Interference in 10km Long Optical Fibre Interferometer. Electronics Letters. 29:7, 634-35. (1993).
Townsend et al. Enhanced Single Photon Fringe Visibility in A 10 km-Long Prototype Quantum Cryptography Channel. Electronics Letters. 29:14, 1291-93 (1993).
Townsend, P.D. Secure key distribution system based on quantum cryptography. Electronics Letters. 30:10, 809-11. (1994).
Phoenix, Simon J.D. et al. Multi-user quantum cryptography on optical networks. Journal of Modern Optics. 42:6, 1155-63. (1995).
Franson, J.D. Violations of a New Inequality for Classical Fields. Johns Hopkins University; NTIS-NASA Publication; Goodard Space Flight Center; Workshop on Squeezed States and Uncertainty Relations. pp. 23-32. (1991).
Galindo et al., "Information and computation: Classical and quantum aspects," May 8, 2002, http://prola.aps.org/.
Gisin, N. et a., "Quantum cryptography", Reviews of Modern Physics, 74:145-195, Jan. 2002.
Gisin, N. "Quantum Cryptography on Noisy Channels: Quantum versus Classical Key-Agreement Protocols," The American Physical Society, Physical Review Letters, vol. 83, No. 20, pp. 4200-4203, Nov. 1999.

Huang, N., "A Novel IP-Routing Lookup Scheme and Hardware Architecture for Multigigabit Switching Routers," IEE Journal of Selected Areas in Communication, vol. 17, No. 6, pp. 1093-1104, Jun. 1999.

Hughes, et al., "Practical quantum key distribution over a 48-km optical fiber network", Los Alamos National Laboratory, Apr. 8, 1999, http://arxiv.org/abs/quant-ph/9904038.

Liu, S., et al., "A Practical Protocol For Advantage Distillation and Information Reconciliation", Designs, Codes & Cryptography, vol. 30, No. 1, pp. 39-62, Aug. 2003.

Mauer, U.M., et al., "Unconditionally Secure Key Agreement and The Intrinsic Conditional Information", IEEE Transactions on Information Theory, vol. 45, No. 2, pp. 499-514, Mar. 1999.

Merolla et al., "Quantum cryptographic device using single-photon phase modulation," Physical Review A, vol. 60, No. 3, Sep. 1999.

Nambu, Y. et al., "BB84 Quantum Key Distribution System based on Silica-Based Planar Lightwave Circuits", Japan Journal of Applied Physics, vol. 43, No. 8B, pp. 1-11, Apr. 2004.

Tittel et al., "Quantum Cryptography Using Entangled Photons in Energy-Time Bell States," Physical Review Letters, vol. 84, No. 20, pp. 4737-4740, May 2000.

Zhang, Xian-Mo and Zhen, Yuliang, "Cryptographically Resilient Functions", IEE Transactions on Information Theory, vol. 43, No. 5, pp. 1740-1747, Sep. 1997. Found at: http://ieeexplore.ieee.org/iel3/18/13537/00623184.pdf?tp+&arnumber=623184&isnumber=1351.

Office Action issued Sep. 26, 2007 in U.S. Appl. No. 10/716,078.
Office Action issued Oct. 29, 2007 in U.S. Appl. No. 10/786,314.
Office Action issued Oct. 11, 2007 in U.S. Appl. No. 10/795,398.
Office Action issued Mar. 27, 2008 in U.S. Appl. No. 10/799,177.
Office Action issued Oct. 5, 2005 in U.S. Appl. No. 09/944,328.
Office Action issued on Mar. 31, 2005 in U.S. Appl. No. 09/943,709.
Office action issued on Oct. 6, 2005 in U.S. Appl. No. 09/943,709.
Office Action issued on Nov. 17, 2006 in U.S. Appl. No. 09/944,328.
Office action issued on Feb. 15, 2006 in U.S. Appl. No. 10/271,103.
Office action issued on Aug. 8, 2006 in U.S. Appl. No. 10/271,103.
Office action issued on Nov. 26, 2007 in U.S. Appl. No. 10/716,747.

* cited by examiner

SYSTEMS AND METHODS FOR IMPLEMENTING ROUTING PROTOCOLS AND ALGORITHMS FOR QUANTUM CRYPTOGRAPHIC KEY TRANSPORT

CROSS REFERENCE TO RELATED APPLICATION

The instant application claims priority from provisional application No. 60/456,815, filed Mar. 21, 2003, the disclosure of which is incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Projects Agency (DARPA).

RELATED APPLICATIONS

The present application is related to U.S. patent application Ser. No. 10/803,509, entitled "Systems and Methods for Implementing Routing Protocols for Quantum Cryptographic Key Transport," and filed on Mar. 18, 2004; and U.S. patent application Ser. No. 09/611,783 entitled "Systems and Methods for Implementing a Quantum-Cryptographic Communications Network," and filed on Jul. 7, 2000, the disclosures of which are incorporated by reference herein in their entirety.

FIELD OF THE INVENTION

The present invention relates generally to cryptographic systems and, more particularly, to systems and methods for implementing routing protocols and algorithms for key transport in quantum cryptographic systems.

BACKGROUND OF THE INVENTION

Conventional packet-switching networks permit cheap and reliable communications independent of the distance between a source node and a destination node in the network. These conventional networks often rely upon either public keys or shared private keys to provide privacy for messages that pass through the network's links. Public key cryptographic systems have the drawback that they have never been proven to be difficult to decipher. Therefore, it is possible that a method of efficiently cracking public key systems may one day be discovered. Such a discovery could make all public key technology obsolete. All supposedly "secure" networks based on public key technology would thus become vulnerable. Shared private keys also have the drawback that the logistics of distributing the private keys can be prohibitive.

Quantum cryptography represents a recent technological development that provides for the assured privacy of a communications link. Quantum cryptography is founded upon the laws of quantum physics and permits the detection of eavesdropping across a link. Quantum cryptographic techniques have been conventionally applied to distribute keys from a single photon source to a single photon detector, either through fiber optic strands or through the air. Although this approach is perfectly feasible for scientific experiments, it does not provide the kind of "anyone to anyone" connectivity that is provided by current communications technology. Conventional quantum cryptographic techniques require a direct connection to anyone with whom one wishes to exchange keying material. Obviously, a large system built along these lines would be impractical, since it would require every person to have enough sources and/or detectors, and fiber strands so that they could employ a dedicated set of equipment for each party with whom they intend to communicate.

Furthermore, conventional quantum cryptographic techniques fail to adequately handle the situations in which eavesdropping is present on a link or when a dedicated link fails (e.g., a fiber is accidentally cut). In conventional quantum cryptographic techniques, further key distribution across the dedicated link becomes impossible until eavesdropping on the link ceases or the link is repaired. In addition, there may exist situations in which a single quantum cryptographic link may not be able to connect two endpoints, such as, for example, if the distance between the two endpoints causes too much signal attenuation, or because the two endpoints use different, incompatible optical encoding schemes.

It would, thus, be desirable to implement a quantum cryptographic network that could provide the "any to any" connectivity of conventional packet-switching networks, such as the Internet, while eliminating the need for a direct connection between parties transporting quantum cryptographic key material, and which may further sustain key distribution even with link failure and/or when eavesdropping exists on the link.

Therefore, there exists a need for systems and methods that combine the assured privacy achieved with quantum cryptography with the distance independent communication achieved with conventional multi-node, multi-link packet switching networks.

SUMMARY OF THE INVENTION

Systems and methods consistent with the present invention address this and other needs by implementing routing protocols and algorithms in a quantum cryptographic network, that includes multiple nodes, for transporting secret keys from one end of the quantum cryptographic key distribution (QKD) network to another. Link metrics associated with each link of the QKD network may be determined and then disseminated throughout the network. The link metrics may be determined, in some implementations, based on a number of secret key bits exchanged between each node connected by a respective link. The disseminated link metrics may be used to determine one or more paths through the QKD network for transporting end-to-end keys that can be used by QKD endpoints for encrypting/decrypting data sent across a public channel.

In accordance with the purpose of the invention as embodied and broadly described herein, a method of transporting keys in a quantum cryptographic key distribution (QKD) network includes determining one or more paths for transporting secret keys, using QKD techniques, across a QKD network. The method further includes transporting the secret keys across the QKD network using the determined one or more paths.

In a further implementation consistent with the present invention, a method of determining link metrics of quantum cryptographic links connecting a node to neighboring nodes in a quantum cryptographic key distribution (QKD) network is provided. The method includes exchanging secret key bits with each of the neighboring nodes using quantum cryptographic mechanisms via the quantum cryptographic links and determining a respective number of available secret key bits exchanged with each of the neighboring nodes. The method further includes determining link metrics associated with each of the quantum cryptographic links based on the respective number of secret key bits exchanged with each of the neighboring nodes.

In an additional implementation consistent with the present invention, a method of determining a link metric for each direction along quantum cryptographic links in a quantum cryptographic key distribution (QKD) network includes exchanging quantities of secret key bits between neighboring nodes in the QKD network using quantum cryptographic mechanisms over the quantum cryptographic links. The method further includes determining link metrics for each direction along each respective quantum cryptographic link of the quantum cryptographic links based on the exchanged quantities of secret key bits.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the present invention provide mechanisms for routing secret encryption/decryption keys across a QKD network. Routing, consistent with the present invention, may use link metrics derived, in some implementations, from a number of secret key bits exchanged between each node connected by a respective link. The derived link metrics may be used in a number of routing algorithms for determining at least one "best" path through the QKD network for subsequent end-to-end key transport.

Exemplary Network

Figure 1:
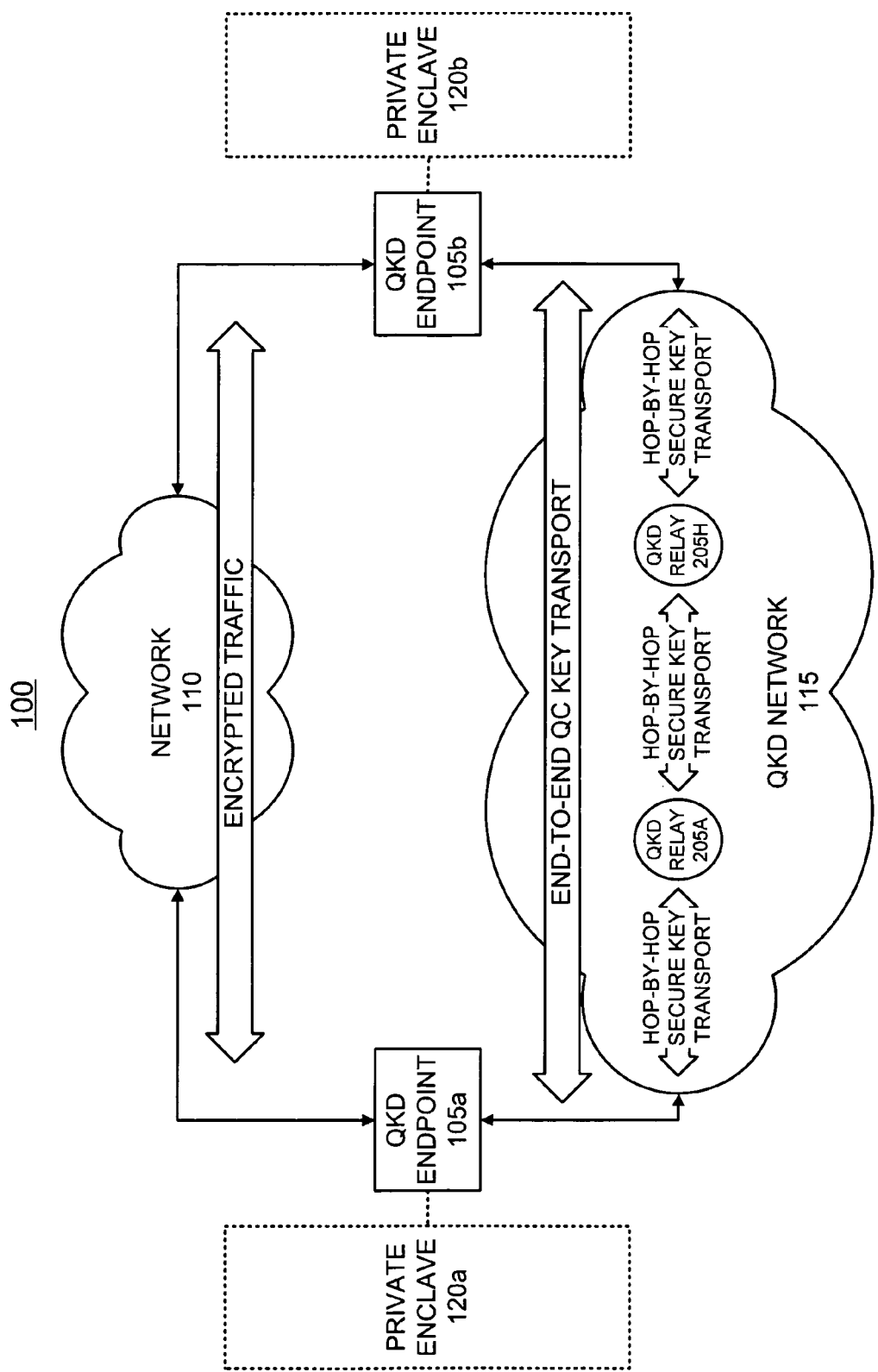
FIG. 1 illustrates an exemplary network in which systems and methods, consistent with the present invention, may be implemented.

FIG. 1 illustrates an exemplary network 100 in which systems and methods for distributing encryption keys via quantum cryptographic mechanisms, consistent with the present invention, may be implemented. Network 100 may include QKD endpoints 105a and 105b connected via sub-network 110 and QKD sub-network 115. Two QKD endpoints 105a and 105b are shown by way of example only. Network 100 may include multiple QKD endpoints 105 connected via sub-network 110 and QKD sub-network 115.

QKD endpoints 105a and 105b may each include a host or a server. QKD endpoints 105a and 105b that include servers may further connect to private enclaves 120a and 120b, respectively. Each private enclave 120 may include local area networks (LANs) (not shown) interconnected with one or more hosts (not shown). Sub-network 110 can include one or more circuit-switched or packet-switched networks of any type, including a Public Land Mobile Network (PLMN), Public Switched Telephone Network (PSTN), LAN, metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

QKD sub-network 115 may include one or more QKD relays (QKD relays 205A and 205H shown for illustrative purposes only) for transporting end-to-end secret keys between a source QKD endpoint (e.g., QKD endpoint 105a) and a destination QKD endpoint (e.g., QKD endpoint 105b). The QKD relays of QKD sub-network 115 may include trusted relays. Trusted QKD relays may include QKD relays that consist of a known or assumed level of security.

Consistent with the present invention, each QKD relay 205 and QKD endpoint 105 of sub-network 115 may exchange secret key bits, via QKD techniques, with each of its neighboring QKD relays. For example, as shown in FIG. 1, QKD endpoint 105a, QKD relay 205A, QKD relay 205H, and QKD endpoint 105b may exchange secret key bits with each "neighbor" that may used for transporting end-to-end keys between the neighboring nodes. For example, QKD endpoint 105a and QKD relay 205A may exchange a first set of secret key bits for transporting an end-to-end key. QKD relay 205A and QKD relay 205H may exchange a second set of secret key bits for transporting an end-to-end key. QKD relay 205H and QKD endpoint 105b may exchange a third set of secret key bits for transporting an end-to-end key.

Subsequent to key transport via QKD sub-network 115, QKD endpoint 105a and QKD endpoint 105b may encrypt end-to-end traffic using the transported key(s) and transmit the traffic via sub-network 110.

Figure 2:
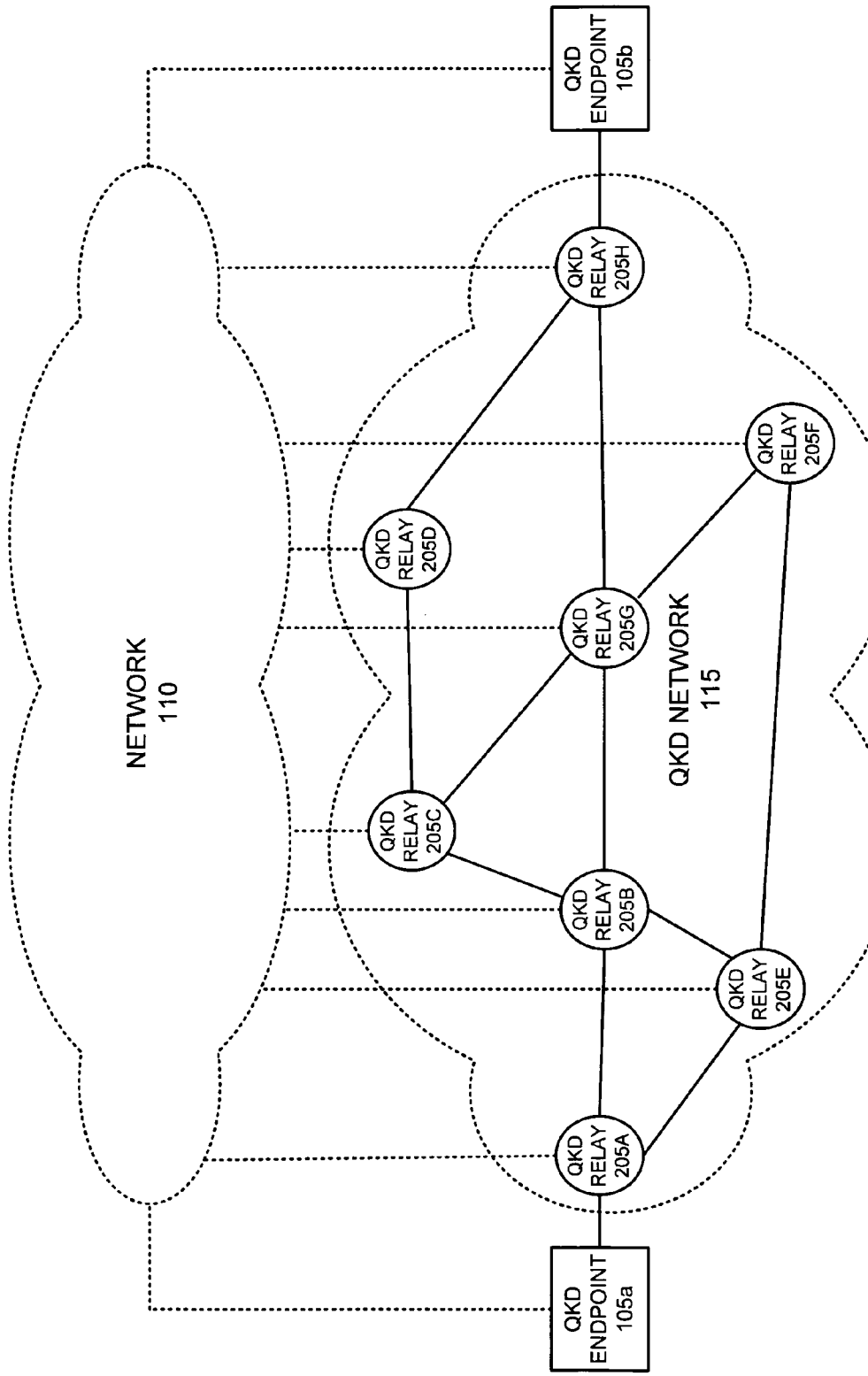
FIG. 2 illustrates exemplary QKD relay nodes of the QKD network of FIG. 1 consistent with the present invention.

FIG. 2 illustrates an exemplary diagram, consistent with the present invention, that depicts QKD relays of QKD sub-network 115. QKD sub-network 115 may include one or more QKD relays 205A-205H interconnected via one or more links that may carry light throughout the electromagnetic spectrum, including light in the human-visible spectrum and light beyond the human-visible spectrum, such as, for example, infrared or ultraviolet light. The interconnecting links may include, for example, conventional optical fibers. Alternatively, the interconnecting links may include free-space optical paths, such as, for example, through the atmosphere or outer space, or even through water or other transparent media. As another alternative, the interconnecting links may include hollow optical fibers that may be lined with photonic band-gap material. Sub-network 115 may consist of a mixture of such differing types of links, e.g., some links being freespace, others being through fiber, and yet others based on entanglement. As shown in FIG. 2, QKD endpoints 105a and 105b may each connect with one or more QKD relays of QKD sub-network 115. The configuration of the relays of QKD sub-network 115, and the interconnection of QKD endpoint 105a and 105b, as shown in FIG. 2, is for illustrative purposes only. More, or fewer, QKD relays 205 may exist in QKD sub-network 115, with various different links interconnecting the QKD relays 205. Additionally, each QKD endpoint 105 may have QKD links to multiple QKD relays, thus, permitting fully disjoint paths between the endpoints.

Figure 3:
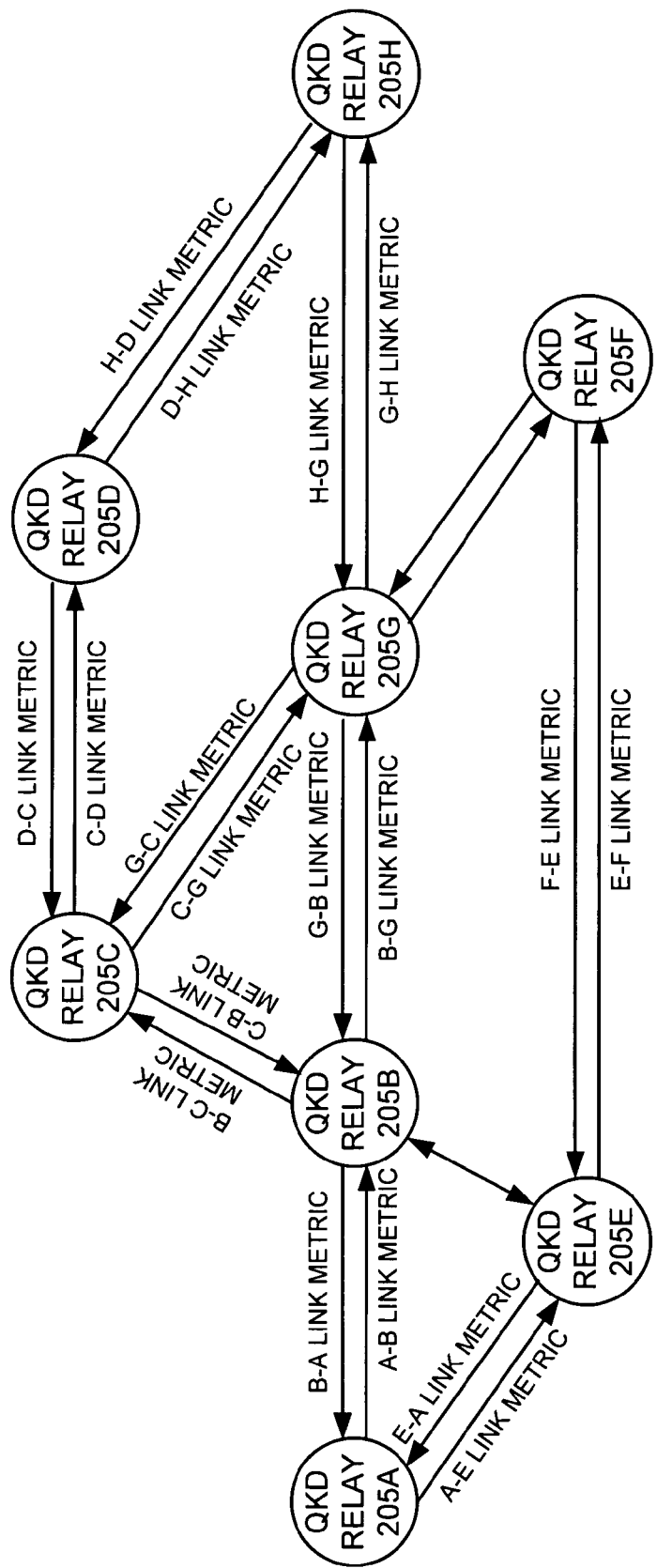
FIG. 3 illustrates exemplary QKD link metrics associated with the links between the QKD relay nodes of FIG. 2 consistent with the present invention.

FIG. 3 illustrates a link metric diagram that depicts one or more metrics associated with each link between each QKD relay 205 of QKD sub-network 115. The one or more metrics associated with each link may be determined in a number ways, including, for example, by a function of a number of secret key bits exchanged between two relays at each end of a respective link. The one or more metrics associated with each link may be determined in other exemplary ways, including, for example, basing a link metric on rates of change in a number of secret bits shared between two relays, a time series average of a number of secret bits shared between two relays, and/or predictions of a number of shared secret bits that will be available at two relays interconnected by a respective link. In one implementation, a metric $M_{link}$ for each link may be determined in accordance with the following:

$$M_{LINK} = 5 + \frac{100}{q+1} \quad \text{Eqn. (1)}$$

where q is associated with a number of shared secret bits for a given link. In some implementations, for example, q may represent a number of blocks of known size of shared secret bits. In other implementations, q may represent just the number of individual shared secret bits for the given link.

Each link of QKD sub-network 115 may have either "simplex" or "duplex" link metrics. A link with a "simplex" link metric may have a single metric for both directions along the link. A link with "duplex" link metrics may have two distinct metrics, one for each direction along the link. For example, FIG. 3 illustrates "duplex" link metrics between each QKD relay 205 of QKD sub-network 115. In FIG. 3, for example, two link metrics (i.e., D-C link metric, C-D link metric) exist between QKD relays 205C and 205D. Similarly, two link metrics (i.e., F-E link metric, E-F link metric) exist between QKD relays 205E and 205F.

Figure 4A:
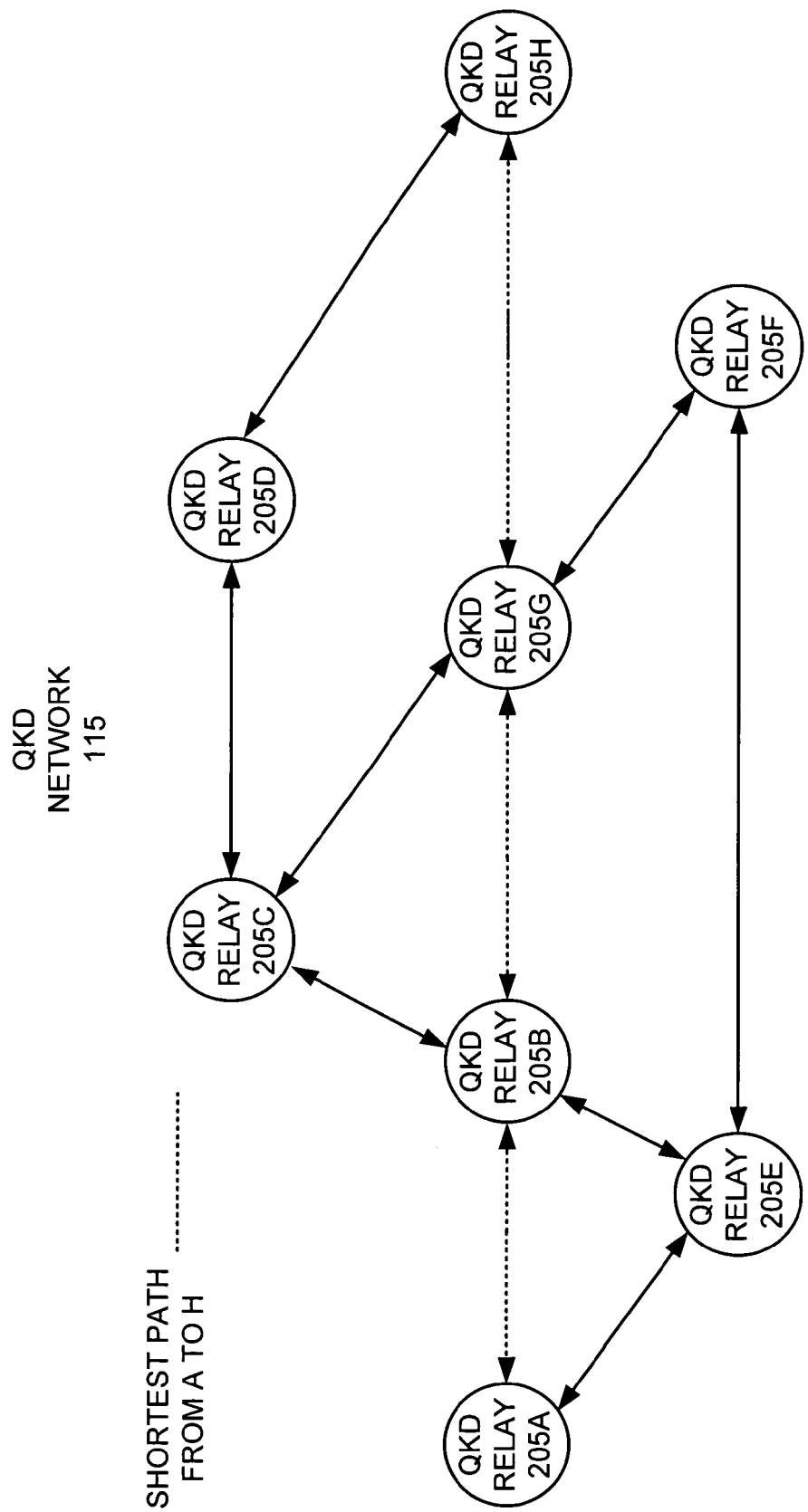
FIG. 4A illustrates an exemplary shortest path for transporting end-to-end secret keys through the QKD network of FIG. 2 consistent with the present invention.

FIG. 4A illustrates one implementation consistent with the invention in which a shortest path through QKD network 115, from QKD relay 205A to QKD relay 205H, is determined for transporting end-to-end secret keys via QKD. Once a node has received link metrics associated with every link between every node in QKD network 115, the node may construct an entire network graph that includes the link metrics for each link in the network. The node may then employ standard algorithms for computing the "best" paths (e.g., least cost) for key transport through QKD network 115. A wide range of conventional algorithms exist for determining a "best" path through QKD network 115. In one implementation, for example, the conventional Shortest Path First (SPF), also known as Dijkstra's algorithm, may be employed. This algorithm allows any node in QKD network 115 to determine a single shortest path from itself to any other node in QKD network 115. For example, this algorithm permits QKD relay 205A to determine the shortest path from itself to QKD relay 205H across QKD network 115. As shown in FIG. 4A, an exemplary "best" path may include the path that includes QKD relay 205A, QKD relay 205B, QKD relay 205G and QKD relay 205H.

Figure 4B:
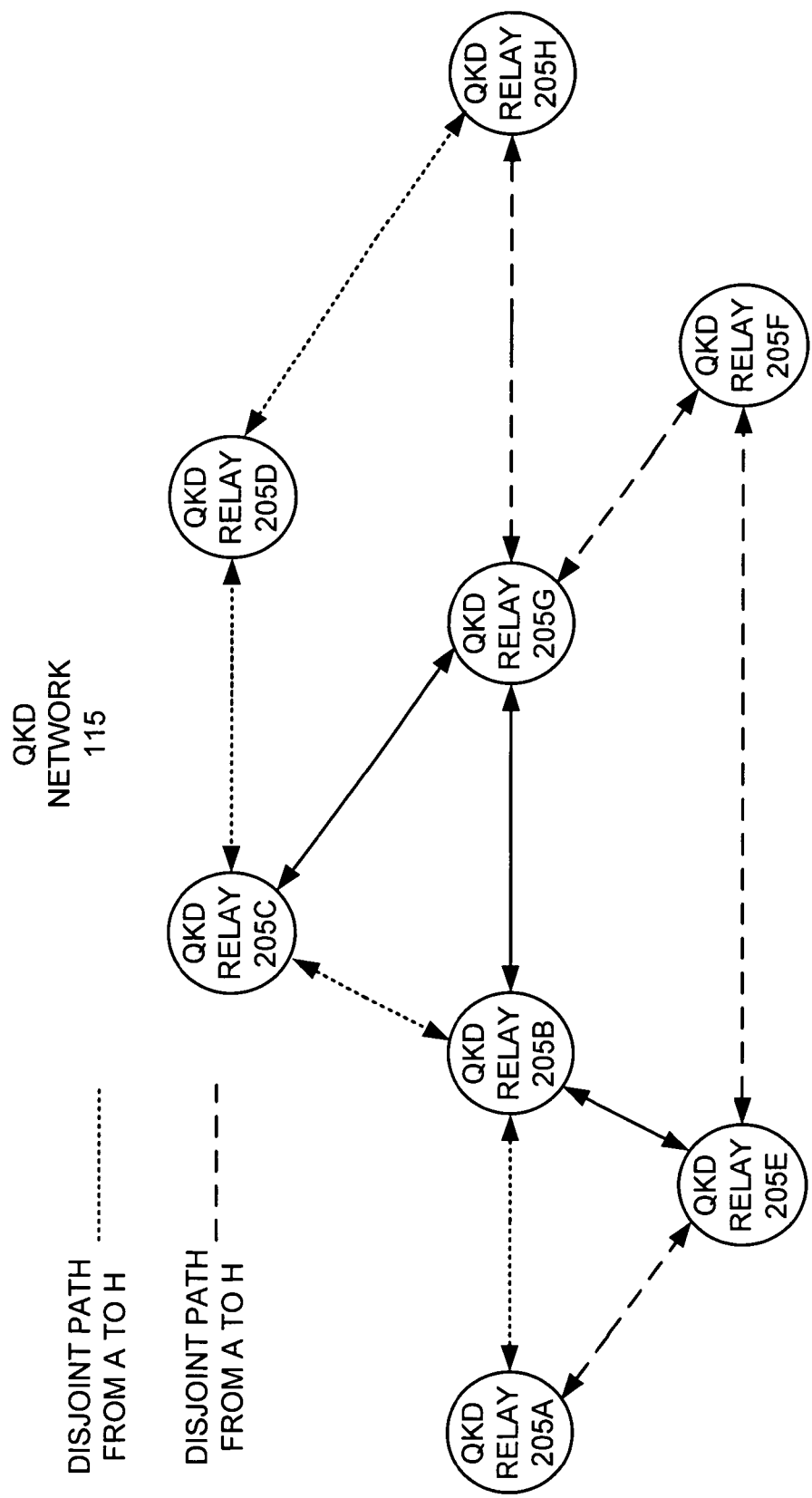
FIG. 4B illustrates exemplary disjoint paths through the QKD for transporting end-to-end secret keys through the QKD of network of FIG. 2 consistent with the present invention.

FIG. 4B illustrates another implementation consistent with the invention in which two or more disjoint, or partially disjoint, paths are determined for transporting end-to-end secret keys via QKD across QKD network 115 (only two disjoint paths are shown in FIG. 4B for illustrative purposes). For example, as shown in FIG. 4B, a first disjoint path may be determined that includes QKD relay 205A, QKD relay 205B, QKD relay 205C, QKD relay 205D and QKD relay 205H. A second disjoint path may be determined that includes QKD relay 205A, QKD relay 205E, QKD relay 205F, QKD relay 205G and QKD relay 205H. A number of conventional algorithms exist for determining two or more disjoint, or partially disjoint, paths through a network.

Exemplary QKD Relay

Figure 5A:
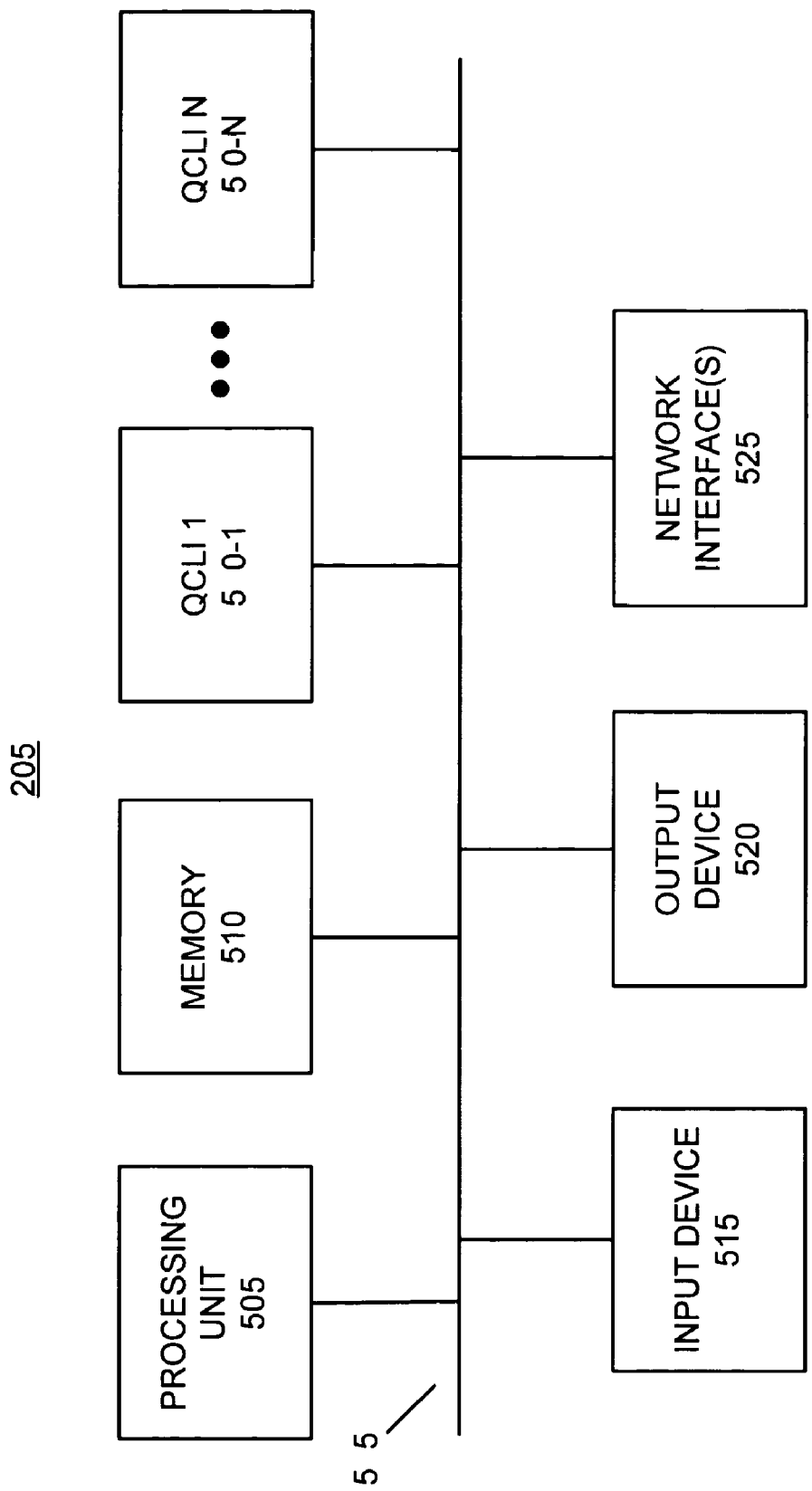
FIG. 5A illustrates an exemplary configuration of a QKD relay consistent with the present invention.

FIG. 5A illustrates components of an exemplary QKD relay 205 in which quantum cryptographic techniques can be implemented. QKD endpoints 105a and 105b may be similarly configured. QKD relay 205 may include a processing unit 505, a memory 510, an input device 515, an output device 520, one or more network interfaces 525, one or more quantum cryptographic link interfaces (QCLI 1 530-1 through QCLI-N 530-N) and a bus 535.

Processing unit 505 may perform all data processing functions for inputting, outputting, and processing of data. Memory 510 may include Random Access Memory (RAM) that provides temporary working storage of data and instructions for use by processing unit 505 in performing processing functions. Memory 510 may additionally include Read Only Memory (ROM) that provides permanent or semi-permanent storage of data and instructions for use by processing unit 505. Memory 510 can include large-capacity storage devices, such as a magnetic and/or optical recording medium and its corresponding drive.

Input device 515 permits entry of data into QKD relay 205 and includes a user interface (not shown). Output device 520 permits the output of data in video, audio, and/or hard copy format. Network interface(s) 525 interconnect QKD relay 205 with sub-network 110 via links unprotected by quantum cryptographic techniques. QCLI 530-1 through QCLI 530-N interconnect QKD relay 205 with QKD sub-network 115 via links protected by quantum cryptographic techniques. Bus 535 interconnects the various components of QKD relay 205 to permit the components to communicate with one another.

Exemplary Quantum Cryptographic Link Interface

Figure 5B:
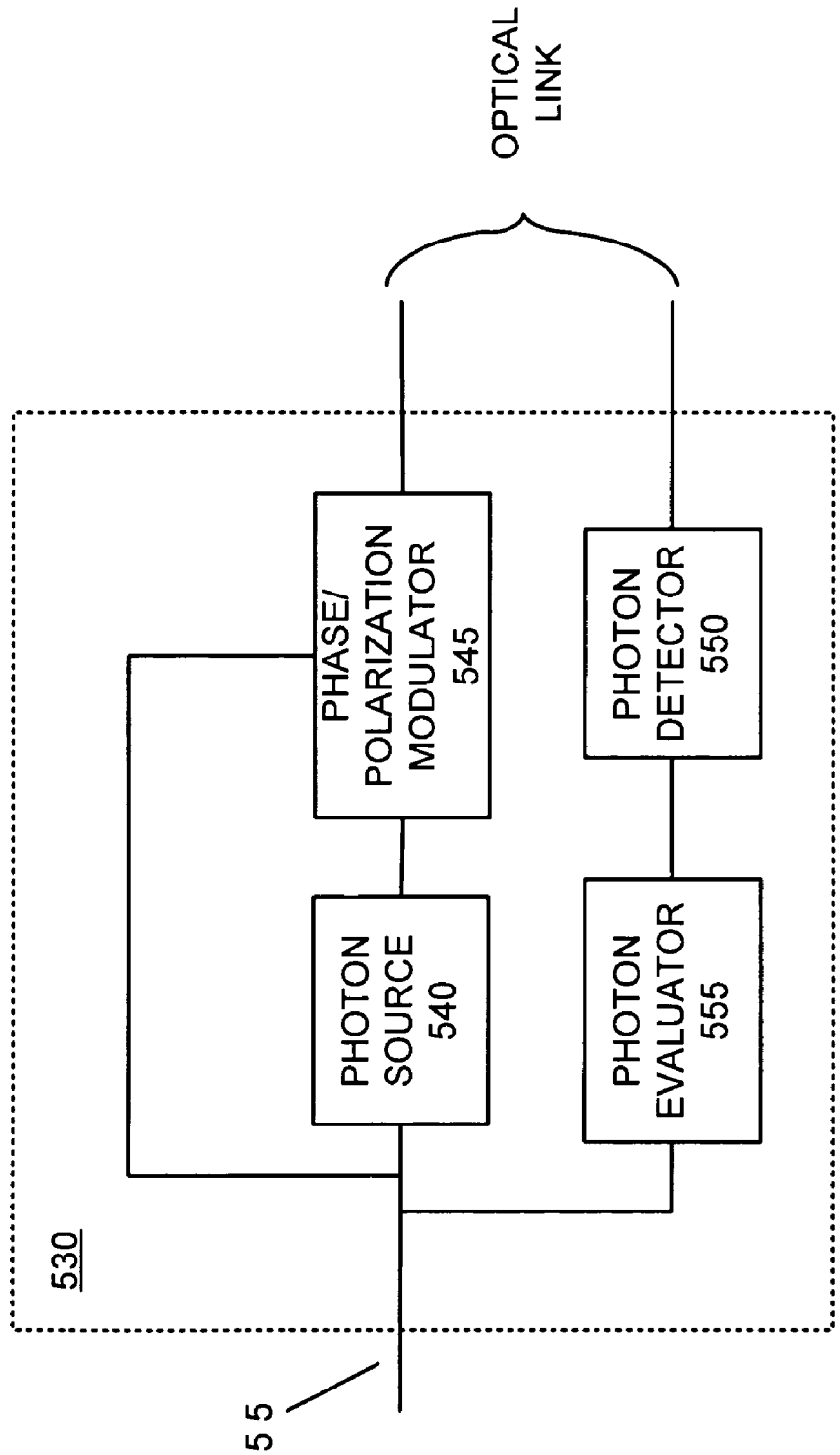
FIG. 5B illustrates an exemplary configuration of a quantum cryptographic link interface of the QKD relay of FIG. 5A consistent with the present invention.

FIG. 5B is a diagram illustrating exemplary components of a quantum cryptographic link interface QCLI 530. Other QCLI's in a QKD relay 205 may be configured similarly to QCLI 530 shown in FIG. 5B. QCLI 530 may include a photon source 540, a phase/polarization modulator 545, a photon detector 550, a photon evaluator 555, and a bus 535.

Photon source 540 may include, for example, a conventional semiconductor laser. Photon source 540 produces photon signals according to instructions provided by processing unit 505. Phase/polarization modulator 545 may include, for example, conventional semiconductor phase modulators or conventional liquid crystal polarization modulators. Phase/polarization modulator 545 may encode outgoing photon signals from photon source 540 according to commands received from processing unit 505 for transmission across an optical link.

Photon detector 550 can include, for example, conventional avalanche photo diodes (APDs) or conventional photomultiplier tubes (PMTs). Photon detector 550 may detect photon signals received across an optical link from other QCLI's in QKD network 115.

Photon evaluator 555 can include conventional circuitry for processing and evaluating output signals from photon detector 550 in accordance with conventional quantum cryptographic techniques.

Exemplary QKD Neighbor Database

Figure 6:
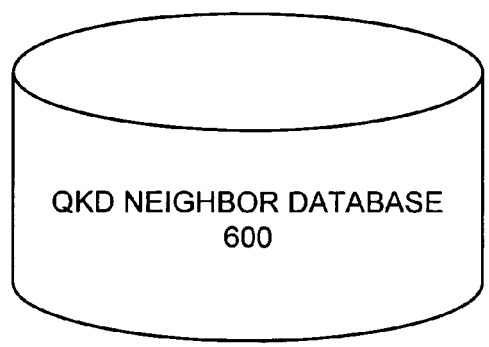
FIG. 6 illustrates an exemplary QKD neighbor database associated with the QKD relay of FIG. 5A consistent with the present invention.
Figure 7:
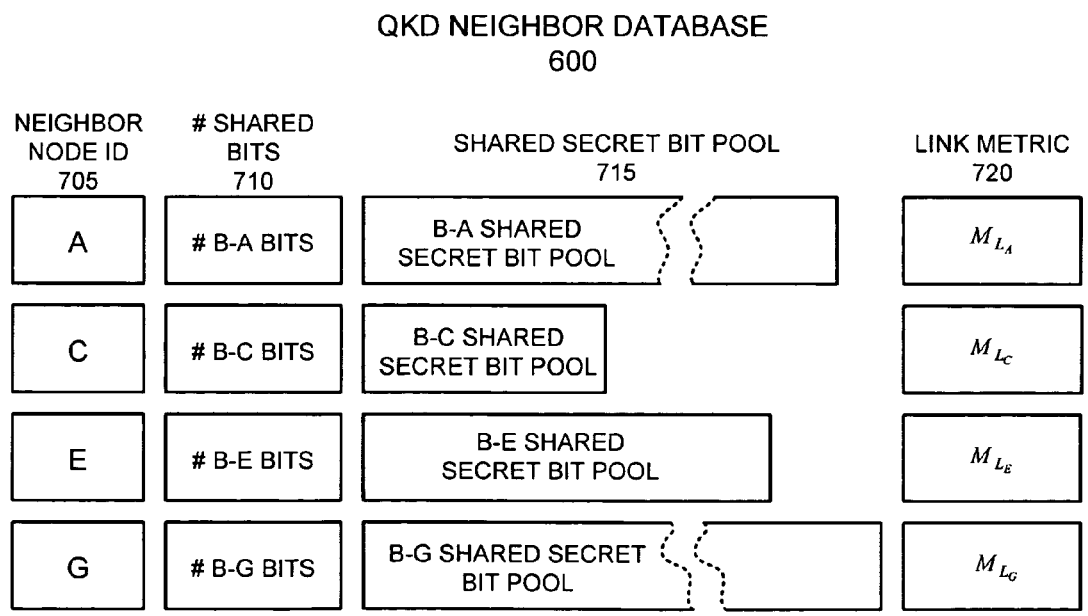
FIG. 7 illustrates an exemplary configuration of the QKD neighbor database of FIG. 6 consistent with the present invention.

FIG. 6 illustrates an exemplary QKD neighbor database 600 that may be associated with a QKD relay 205 consistent with the present invention. Database 600 may be stored in memory 510 of QKD relay 205, or may be located externally to QKD relay 205. QKD neighbor database 600 may include multiple entries, such as, for example, one entry for each neighboring node. By way of example, FIG. 7 illustrates an exemplary database 600 associated with QKD relay 205B of QKD network 115. A different QKD neighbor database 600 may, though, be associated with each QKD relay 205 of QKD network 115.

Each entry of QKD neighbor database 600 may include a neighbor node identifier 705, a number of shared bits value 710, a shared secret bit pool 715 and a link metric 720. Neighbor node identifier 705 may uniquely identify a neighboring node. In some implementations, for example, identifier 705 may include a network address of the neighboring node. In the example of FIG. 7, database 600 includes entries for each of QKD relays 205A, 205C, 205E and 205G. The number of shared bits value 710 indicates the exact number of secret bits shared with the node identified by node identifier 705 via QKD. For example, the number of shared bits value 710 for QKD relay 205A may include the number of bits shared between QKD relay 205B and 205A. Shared secret bit pool 715 may contain the secret bits shared with the node identified by node identifier 705 via QKD. Link metric 720 may include a metric value associated with a "length" or "cost" of a link identified by the corresponding neighbor node ID 705. For example, as shown in FIG. 7, a link metric of MLA may be associated with the link between QKD relay 205B and QKD relay 205A identified by neighbor node ID 705.

Exemplary Link State Advertisement

Figure 8:
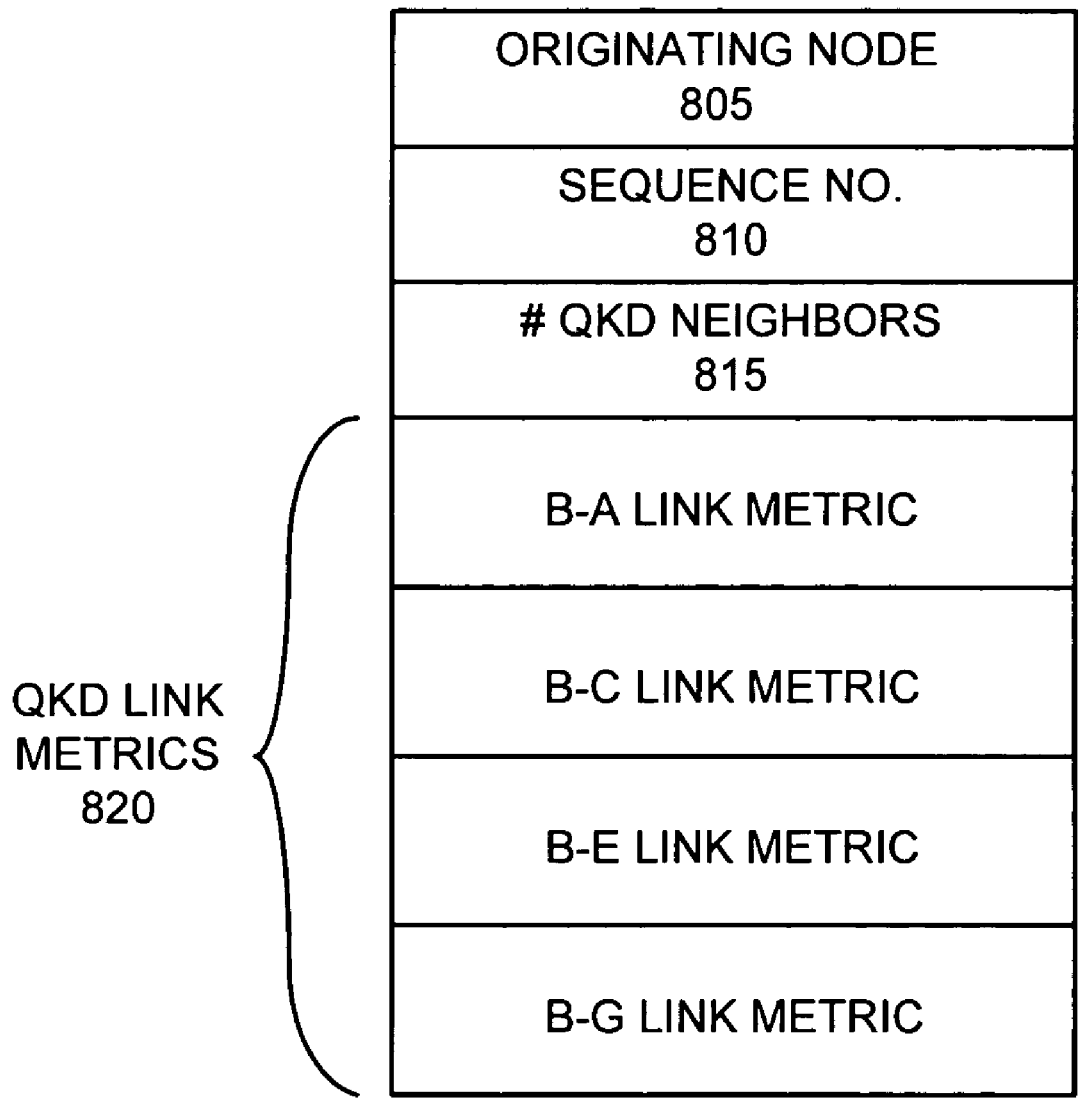
FIG. 8 illustrates an exemplary link state advertisement for disseminating link metrics consistent with the present invention.

FIG. 8 illustrates an exemplary link state advertisement that may be used by a QKD relay for advertising the link metrics of each link connected to the QKD relay. Link state advertisement 800 may include an originating node identifier 805, a sequence number 810, a number of QKD neighbors value 815 and QKD link metrics 820. Originating node identifier 805 may include a unique identifier associated with the node that originated advertisement 800. In some implementations, for example, identifier 805 may include a network address associated with the node that originated the advertisement 800. Sequence number 810 may include a value that identifies a sequential number that advertisement 800 represents in a sequence of advertisements. Number of QKD neighbors 815 identifies a number of nodes that neighbor the node that originated advertisement 800. For example, if QKD relay 205B of FIG. 2 originates a link state advertisement, the # of QKD neighbors 815 may indicate four neighboring nodes—QKD relay 205A, QKD relay 205C, QKD relay 205E and QKD relay 205G. QKD link metrics 820 indicate a link metric for each link connected to a neighboring node. For example, if QKD relay 205B of FIG. 2 originates a link state advertisement, QKD link metrics 820 may include four link metrics: a B-A link metric indicating the metric of the link between QKD relay 205B and QKD relay 205A, a B-C link metric indicating the metric of the link between QKD relay 205B and QKD relay 205C, a B-E link metric indicating the metric of the link between QKD relay 205B and QKD relay 205E and a B-G link metric indicating the metric of the link between QKD relay 205B and QKD relay 205G.

Exemplary Link Metrics Determination Process

Figure 9:
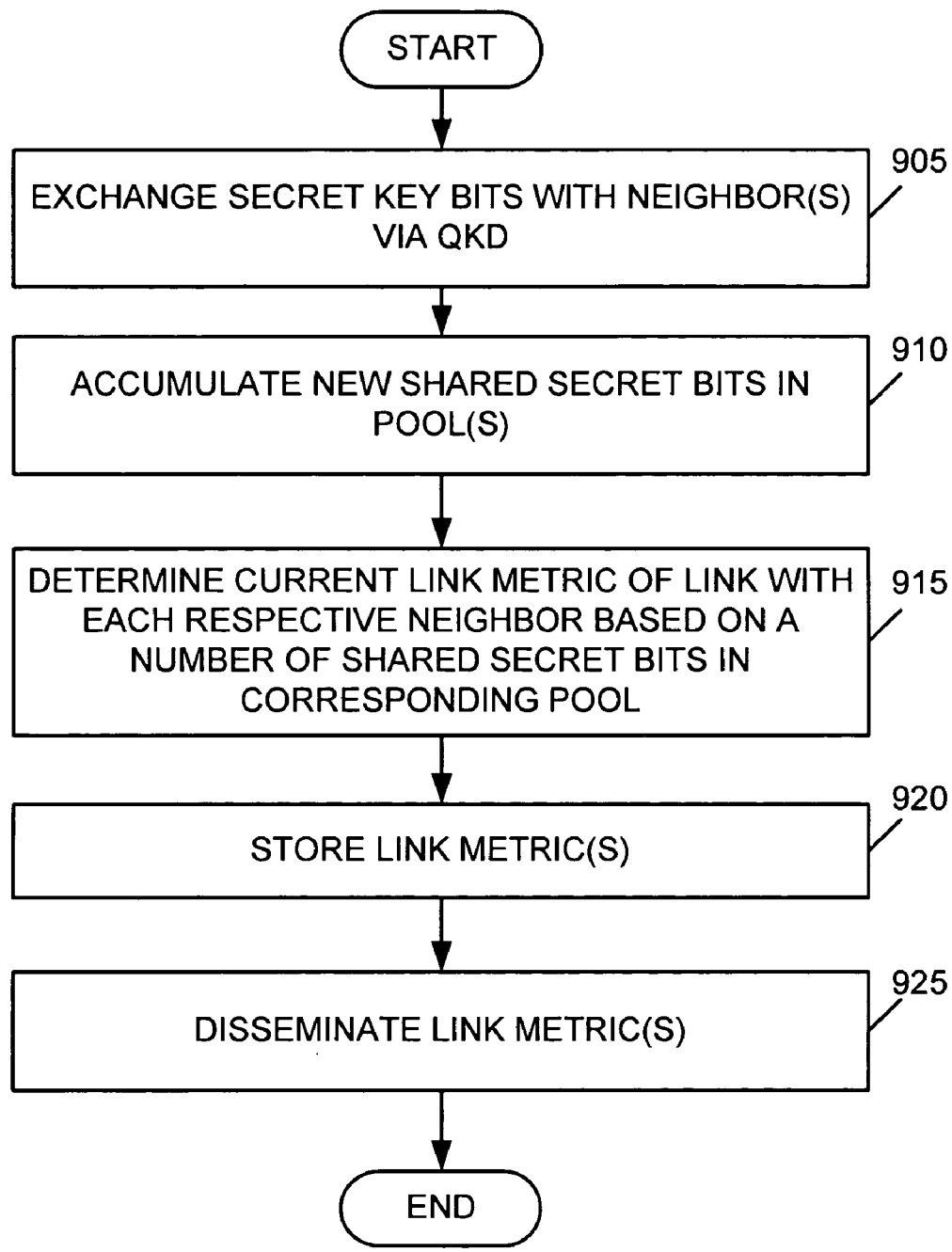
FIG. 9 is a flow chart that illustrates an exemplary QKD link metric determination process consistent with the present invention.

FIG. 9 is a flowchart that illustrates an exemplary process, consistent with the present invention, for determining link metrics of links connecting a QKD relay 205 with neighboring QKD relays. As one skilled in the art will appreciate, the method exemplified by FIG. 9 can be implemented as a sequence of instructions and stored in a respective memory 510 of each QKD relay 205 for execution by a respective processing unit 505.

The exemplary process may begin with the exchange of secret key bits with neighboring nodes (i.e., QKD relays and QKD endpoints) of QKD network 115 via quantum key distribution [act 905]. For example, as shown in FIG. 2, QKD relay 205B may exchange a first set of key bits with QKD relay 205A, a second set of key bits with QKD relay 205C, a third set of key bits with QKD relay 205E and a fourth set of key bits with QKD relay 205G via QKD. The new secret bits shared with each of the neighboring nodes may be accumulated in a respective pool of shared secret bit pools 715 [act 910]. For example, the sets of key bits exchanged with QKD relay 205B may be accumulated in a respective shared secret bit pool of QKD neighbor database 600.

A current link metric of each link with each respective neighboring node may be determined based on a number of shared secret bits 710 in a corresponding pool of shared secret bit pools 715 [act 915]. For example, a number of shared secret bits 710 for neighbor QKD relay 205A may be retrieved from QKD neighbor database 600 and a link metric may be assigned to the link between QKD relay 205B and QKD relay 205A based on the retrieved number of shared secret bits 710. Metrics associated with each link may be determined in a number ways, including, for example, as a function of the number of currently available secret key bits exchanged between two relays at each end of a respective link. The one or more metrics associated with each link may be determined in other exemplary ways, including, for example, basing a link metric on rates of change in a number of secret bits shared between two relays, a time series average of a number of secret bits shared between two relays, and/or predictions of the number of shared secret bits that will be available at two relays interconnected by a respective link. In one implemen tation, a metric $M_{link}$ for each link may be determined in accordance with Eqn (1):

$$M_{LINK} = 5 + \frac{100}{q+1}$$

where q is associated with a number of shared secret bits for a given link. In some implementations, for example, q may represent a number of blocks of known size of shared secret bits. In other implementations, q may represent just the number of individual shared secret bits for the given link. The determined link metrics may then be stored [act 920]. The determined link metrics may be stored, for example, as link metric values 720 in QKD neighbor database 600.

The determined link metrics may further be disseminated [act 925] via, for example, a link state advertisement 800. Before disseminating link state advertisement 800, an originating node identifier 805 and an appropriate sequence number 810 may be inserted in advertisement 800. Additionally, each link metric associated with a link to a neighboring node may be inserted in the QKD link metrics 820 portion of link state advertisement 800. In some implementations consistent with the invention, the determined link metrics may be reliably "flooded" to neighboring QKD relays. In other implementations consistent with the invention, the determined link metrics may be disseminated to a centralized "route server," which may subsequently be queried by any given node in QKD network 115 to determine a link metric associated with a particular link. In some implementations, for example, a link state advertisement 800 may be disseminated if an entire pool of shared secret bits suddenly runs low such that other nodes in QKD network 115 can be informed that the link metric has changed significantly for that particular link. A link state advertisement 800 may be disseminated periodically. In some implementations, a link state advertisement 800 may be disseminated asynchronously.

Exemplary Key Transport Path Determination Process

Figure 10:
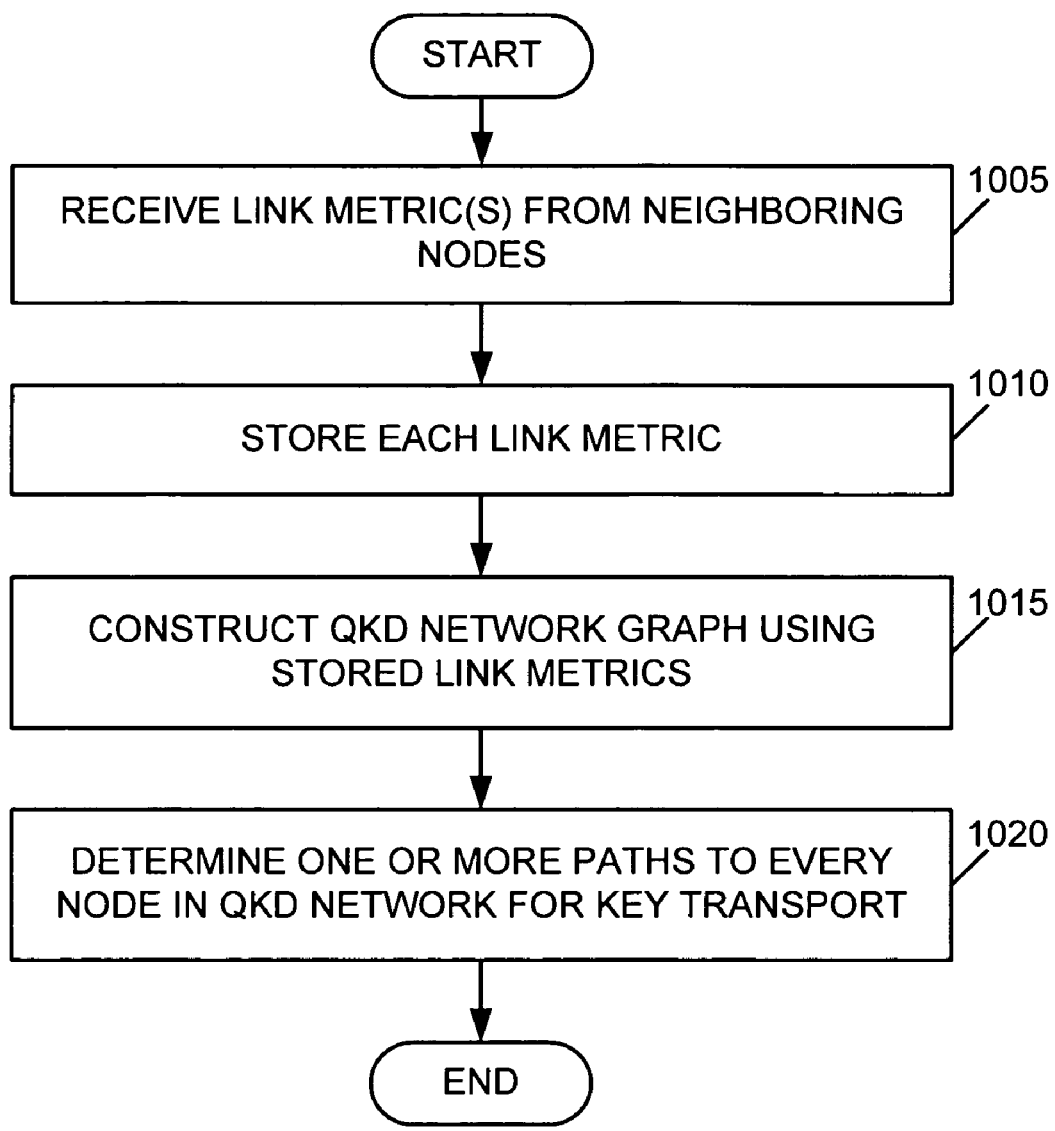
FIG. 10 is a flow chart that illustrates an exemplary process for determining one or more paths for transporting end-to-end secret keys via quantum cryptographic mechanisms consistent with the present invention.

FIG. 10 is a flowchart that illustrates an exemplary process, consistent with the present invention, for determining a secret key transport path through QKD network 115. As one skilled in the art will appreciate, the method exemplified by FIG. 10 can be implemented as a sequence of instructions and stored in memory 510 of QKD relay 205 for execution by processing unit 505.

The exemplary process may begin with the receipt of link metrics from neighboring nodes in QKD network 115 [act 1005]. Link metrics may be received in link state advertisements 800 sent from other nodes in QKD network 115. Each received link metric may be stored, for example, in a link metric value 720 of QKD neighbor database 600 [act 1010]. A QKD network graph may then be constructed using the stored link metrics [act 1015]. Conventional graph algorithms may be used for constructing a graph of QKD network 115 using the stored link metrics. One or more paths may then be determined to every node in QKD network 115 for key transport using the constructed QKD network graph [act 1020]. The one or more paths may be determined using conventional path determination algorithms, such as, for example, the Shortest Path First (SPF) algorithm. Other conventional algorithms, though, may be equivalently used, such as, for example, conventional algorithms that determine two or more disjoint, or partially disjoint, paths through a network. Subsequent to the determination of one or more paths to every node in QKD network 115, secret keys may be transported over the determined one or more paths. In some implementations, for example, key transport may be implemented as described in the related and above-noted co-pending application Ser. No. 10/803,509, entitled "Systems and Methods for Implementing Routing Protocols for Quantum Cryptographic Key Transport."

CONCLUSION

Systems and methods consistent with the present invention, therefore, provide mechanisms for routing end-to-end keys across a QKD network. Routing algorithms, consistent with the present invention, may employ link metrics associated with each link of the QKD network that can be determined based on a number of secret key bits exchanged between each node connected by a respective link. The determined link metrics may then be disseminated throughout the network so that conventional graph theory algorithms may be employed to determine one or more paths through the QKD network. The determined one or more paths may be used for transporting end-to-end keys that can be used by QKD endpoints for encrypting/decrypting data sent across a public channel.

The foregoing description of implementations of the present invention provides illustration and description, but is not intended to be exhaustive or to limit the invention to the precise form disclosed. Modifications and variations are possible in light of the above teachings or may be acquired from practice of the invention. For example, instead of a single centralized "route" server, used in some implementations as described above, for storing link metrics and determining paths through QKD sub-network 115, multiple redundant "route" servers may be employed. Additionally, a hierarchical or "regional" set of "route" servers may be employed for large QKD networks. Furthermore, though some implementations of the present invention have been described as using link-state protocols, other non-link state routing protocols, such as, for example, distance vector, RIP, BGP, PNNI, or so called "on demand" protocols, such as AODV and DSR, may be employed.

While series of acts have been described in FIGS. 9-10, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of disseminating link metrics associated with quantum cryptographic links connecting a node to neighboring nodes in a quantum cryptographic key distribution (QKD) network, the method comprising:

exchanging, by one or more processors of the node, secret key bits between the node and each of the neighboring nodes using quantum cryptographic mechanisms via the quantum cryptographic links;

determining, by the one or more processors of the node, a respective number of secret key bits exchanged between the node and each of the neighboring nodes;

determining, by the one or more processors of the node, link metrics associated with each of the quantum cryptographic links based on the respective number of secret key bits exchanged between the node and each of the neighboring nodes; and disseminating, by the one or more processors of the node, the link metrics from the node to the neighboring nodes for use in transporting encryption keys for data encryption.

2. The method of claim 1, further comprising:

storing the respective secret key bits exchanged between the node and each of the neighboring nodes, and where determining the link metrics associated with each of the quantum cryptographic links further comprises:

determining a rate of change in a number of the stored respective secret key bits.

3. The method of claim 1, further comprising:

storing the respective secret key bits exchanged between the node and each of the neighboring nodes, and where in determining the link metrics associated with each of the quantum cryptographic links further comprises:

predicting availability of a number of the stored respective secret key bits.

4. The method of claim 1, where disseminating the link metrics comprises:

disseminating the link metrics using link state routing protocols.

5. The method of claim 1, further comprising:

disseminating the link metrics associated with each of the quantum cryptographic links to other nodes in the network.

6. A computer-readable medium containing instructions for controlling at least one processor to perform a method of disseminating link metrics associated with quantum cryptographic links connecting a node to neighboring nodes in a quantum cryptographic key distribution (QKD) network, the method comprising:

sharing secret key bits between the node and each of the neighboring nodes using quantum cryptographic mechanisms via the quantum cryptographic links;

determining a respective number of secret key bits shared between the node and each of the neighboring nodes;

determining link metrics associated with each of the quantum cryptographic links based on the respective number of secret key bits shared between the node and each of the neighboring nodes; and disseminating the link metrics from the node to the neighboring nodes for use in transporting encryption keys for data encryption.

7. A quantum cryptographic key distribution (QKD) node, comprising:

one or more quantum cryptographic link interfaces to:

exchange secret key bits with each neighboring node using quantum cryptographic mechanisms via one or more quantum cryptographic links;

a memory to store instructions; and one or more processors to execute the instructions to:

determine a respective number of secret key bits exchanged with each neighboring node, determine one or more link metrics associated with each respective quantum cryptographic link of the one or more quantum cryptographic links based on the respective number of secret key bits exchanged with each of the neighboring nodes, and disseminate the one or more link metrics from the QKD node to each of the neighboring nodes for use in transporting encryption keys for data encryption.

8. A system for disseminating link metrics associated with quantum cryptographic links connecting a node to neighboring nodes in a quantum cryptographic key distribution (QKD) network, the system comprising:

a memory to store instructions; and a processor to execute the instructions to implement:

means for exchanging secret key bits between the node and each of the neighboring nodes using quantum cryptographic mechanisms via the quantum cryptographic links;

means for determining a respective number of secret key bits exchanged between the node and each of the neighboring nodes;

means for determining link metrics associated with each respective quantum cryptographic link based on the respective number of secret key bits exchanged between the node and each of the neighboring nodes; and means for disseminating the link metrics from the node to the neighboring nodes for use in transporting encrypting keys for data encryption.

9. A method implemented at a node in a quantum cryptographic key distribution (QKD) network, comprising:

exchanging, by one or more processors of the node, quantities of secret key bits between the node and neighboring nodes in the QKD network using quantum cryptographic mechanisms over quantum cryptographic links;

determining, by the one or more processors of the node, link metrics for each direction along each respective quantum cryptographic link of the quantum cryptographic links based on the exchanged quantities of secret key bits; and disseminating, by the one or more processors of the node, the link metrics from the node to the neighboring nodes for use in transporting encryption keys for data encryption.

10. The method of claim 9, where disseminating the links metrics comprises:

disseminating the link metrics using link state routing protocols.

11. The method of claim 9, further comprising:

disseminating the link metrics associated with each respective quantum cryptographic link to other nodes in the network.

* * * * *